United States Patent [19]

Masaki

[11] 4,403,259
[45] Sep. 6, 1983

[54] APPARATUS FOR READING INFORMATION FROM AN INFORMATION RECORDING DISC

[75] Inventor: Keiji Masaki, Tokorozawa, Japan

[73] Assignee: Universal Pioneer Corporation, Tokyo, Japan

[21] Appl. No.: 306,400

[22] Filed: Sep. 28, 1981

[51] Int. Cl.³ .................. H04N 5/76; G11B 17/22; G11B 7/00
[52] U.S. Cl. .................................. 358/342; 369/32; 369/43
[58] Field of Search ............... 358/312, 335, 342; 369/32, 33, 43, 44; 360/10.1

[56] References Cited

U.S. PATENT DOCUMENTS 4,190,860 2/1980 Somero et al. ................. 369/44 X
4,321,622 3/1982 Jerome et al. ..................... 358/342
4,340,949 7/1982 Kelleher ............................. 369/33

Primary Examiner—Aristotelis M. Psitos
Attorney, Agent, or Firm—Fleit, Jacobson & Cohn

[57] ABSTRACT

An apparatus for reading information from an information recording disc in which the information is recorded successively in the circumferential direction, which includes a timing signal generator for consecutively generating timing pulse signals at a rate proportional to the rotational speed of the recording disc. The apparatus repeats the jump-back operation during pause mode of operation in synchronism with the timing pulse signals.

4 Claims, 1 Drawing Figure

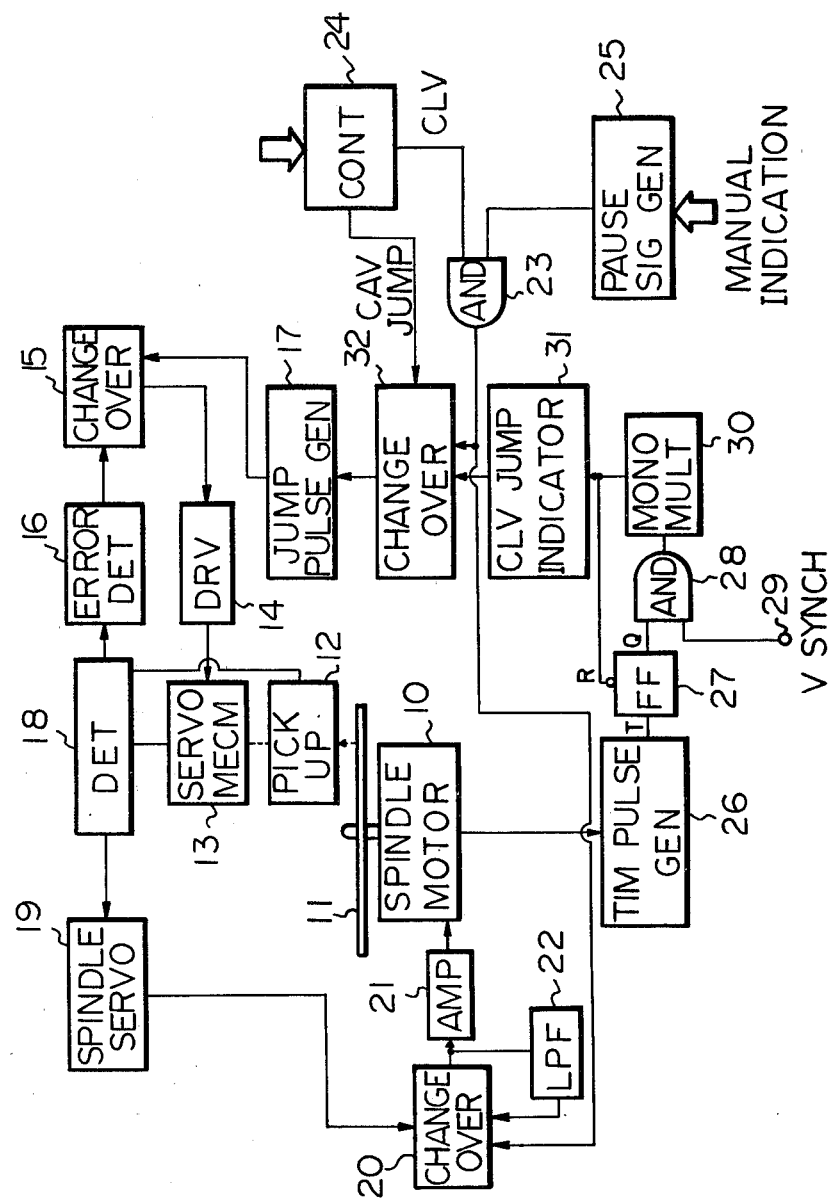

APPARATUS FOR READING INFORMATION FROM AN INFORMATION RECORDING DISC

FIELD OF THE INVENTION

The present invention relates in general to a recording disc player for reading information carried on a recording disc in which the information is recorded successively in the circumferential direction in the form of one or more tracks. The recording disc is, for example, a video disc a digital audio disc (DAD) or the like to be optically, electrostatically or otherwise scanned. Particularly, the present invention is concerned with a controller in the recording disc player as mentioned above, for controlling a pick-up transducer in response to a pause indication signal under constant line veolocity (CLV) mode of operation.

BACKGROUND OF THE INVENTION

In the recording disc player as mentioned above, there is provided a pick-up transducer having a detecting point or spot which is to be aligned on a portion of the recording disc and for reading the information from the portion electrostatically, optically, or otherwise. The pick-up transducer is carried by a slider for positioning the pick-up transducer at such a place or position in the radial direction of the recording disc that the detecting spot lies within a predetermined range or distance from a point below the pick-up transducer on the disc. In order to align the detecting spot on the track on the recording disc, a slider servo system and a tracking servo system are provided in the controller of the recording disc player. The recording disc is rotated in the vicinity of the pick-up transducer at either a constant angular velocity (CAV) or a constant line velocity (CLV) by means of a recording disc drive mechanism such as a turn table. The rotational speed of the recording disc is determined according to the type of the recording disc to be played back, that is, the CAV or CLV disc.

As is well known in the art, it is usually difficult to reproduce as a still picture the video information recorded on a CLV disc. When, therefore, an intermission of the playback operation for the CLV disc is desired, a "pause" mode of operation is performed instead of the still picture reproduction. In the prior art recording disc players, the slider servo system is disabled but only the tracking servo system is kept operative under the pause mode of operation. At the same time, a squelch circuit is made operative during the pause mode of operation so as to avoid incorrect reproduction of information.

It is, however, a problem that the predetermined rage of the detecting spot of the pick-up transducer where the detecting spot can move while the slider is stopped usually extends over several pitches of the track on the recording disc so that some pictures are omitted or not reproduced when the detecting spot lies at or near a maximum deviation upon release of the pause mode of operation.

SUMMARY OF THE INVENTION

The present invention contemplates elimination of such a drawback in the prior art recording disc player as mentioned above and it is, accordingly, a prime object of the present invention to provide a new and improved recording disc player in which any omission of picture or information does not take place upon release of the pause mode of operation.

In accordance with the present invention, such an object of the present invention is accomplished basically in a recording disc reading apparatus comprising a pick-up transducer having a detecting spot which is to be aligned on a portion of the recording disc and for reading the information from the portion; recording disc drive means for rotating the recording disc in the vicinity of the pick-up transducer at a rotational speed which is variable with the radial position of the pick-up transducer with respect to the recording disc; pause signal generating means for producing a pause signal; timing pulse signal generating means for consecutively generating timing pulse signals at a rate proportional to the rotational speed of the recording disc; jump pulse generating means for generating jump pulse during a time period when the pause signal is present; and pick-up transducer positioning means connected to the pick-up transducer, for driving the pick-up transducer so that the detecting spot jumps by a predetermined radial distance on the recording disc in response to the jump pulse.

BRIEF DESCRIPTION OF THE DRAWING

The features and advantages of a recording disc player proposed by the present invention will be more clearly understood from the following description taken in conjunction with the accompanying drawing which is a block diagram showing a controller of a recording disc player according to the present invention.

DETAILED DESCRIPTION OF THE EMBODIMENT

Referring to the drawing, there is shown a controller of a recording disc player according to the invention, which comprises a spindle motor 10 for rotating a recording disc 11 at the CAV or CLV in accordance with a drive signal. A pick-up transducer 12 is provided in the vicinity of the recording disc 11 which has a detecting spot to be aligned onto a position of the recording disc to be read. The pick-up transducer 12 is adapted to produce an electric signal according to information recording on the portion of the disc on which the detecting spot is aligned. The electric signal is delivered to an information processing circuit (not shown) for reproducing the information read from the recording disc. The pick-up transducer 12 is carried by a servo mechanism 13 which places the pick-up transducer 12 at such a position in the radial direction of the recording disc 11 that the detecting spot lies within a predetermined range or distance from a point below the pick-up transducer 12 on the recording disc 11. The servo mechanism 13 further controls the pick-up transducer 12 in accordance with a drive signal from a driver 14 so that the detecting spot constantly lies on a track on the recording disc 11, thereby to perform so-called tracking servo control. The driver 14 is energized by either an error signal or a jump pulse passed through a change-over switch 15. The change-over switch 15 is adapted to pass therethrough the error signal delivered from an error detector 16 but pass therethrough the jump pulse is preference to the error signal when it receives the jump pulse from a jump pulse generator 17. The error detector 16 is adapted to produce the error signal in response to a deviation signal representative of deviation of the detecting spot from a target track on the recording disc 11 which is delivered from a detector 18.

The detector 18 produces the deviation signal in accordance with information obtained from the pick-up transducer 12. The detector 18 further produces a horizontal synchronous pulses in accordance with the information from the pick-up transducer 12 and supplied with the horizontal synchronous pulses to the spindle servo control circuit 19. The spindle servo control circuit 19 produces a voltage in proportionate to the repetition period of the horizontal synchronous pulses supplied thereto. The voltage signal from the spindle servo control circuit 19 is applied to a change-over switch 20. The change-over switch 20 is adapted to pass therethrough the voltage signal to an amplifier 21 as far as it is not receive a pause indication signal. The change-over switch 20 is connected to a low pass filter 22 which feeds back only a DC component contained in the output of the change-over switch 20 to the change-over switch 20. Accordingly, when the change-over switch 20 is triggered by the pause indication signal the change-over switch 20 keeps its output voltage at a level at a time when it receives the pause indication signal thereby to cause the spindle motor 10 to run at a constant speed. The pause signal is obtained from an AND gate 23 when the AND gate 23 is triggered by a CLV indication signal from a control circuit 24 and the pause indication signal generated from a pause indication signal generator 25. The pause indication signal generator 25 is adapted to produce the pause indication signal in response to manual indication by means of a key board or the like. The control circuit 24 is adapted to further produce a CAV jump indication signal in response to signals from other circuit (not shown) in the case of a CAV disc.

The spindle motor 10 is connected to a timing pulse generator 26 which consecutively produces a timing pulse signals at a predetermined rate proportional to the rotational speed of the spindle motor 10, that is, of the recording disc 11. For example, one or more timing pulse signals appear per one rotation of the recording disc 11. The timing pulse signals are applied to a trigger terminal of a flip-flop circuit 27 which changes its state. The Q terminal of the flip-flop circuit 27 is connected to one input terminal of an AND gate 28 the other terminal of which is connected to a terminal 29 through which the vertical synchronous (V synch) pulses obtained from the pick-up transducer 12 is supplied. The output terminal of the AND gate 28 is connected to the trigger terminal of a monostable multivibrator 30 which is triggered at the leading edge of the pulse signal from the AND gate 28 and takes a quasi-stable state during a predetermined time period so as to produce a pulse signal. The pulse signal from the monostable multivibrator 30 is applied to a CLV jump indicator 31 which produces a CLV jump indication signal in response to the trailing edge of the pulse signal from the monostable multivibrator 30. The CLV jump indication signal is applied to a change-over switch circuit 32 which passes therethrough the pause indication signal when it is triggered by the pause indication signal from the AND gate 23. The change-over switch circuit 32 passes therethrough the CAV jump indication signal from the controller 24 when it is not triggered by the pause indication signal. The CLV jump indication signal or the CAV jump indication signal passed through the change-over switch circuit 32 is applied to the jump pulse generator 17. The jump pulse generator 17 produces the jump pulse in response to the CLV or CAV jump indication signal applied thereto.

When, in operation, a CLV disc is mounted on the spindle motor 10 and the pause indication is made manually the pause signal generator 25 produces the pause indication signal and the controller 24 produces the CLV indication signal so that the pause indication signal passed through the AND gate 23 is applied to the change-over switch 22 and the change-over switch circuit 32. Thus, the spindle servo circuit 19 is disconnected from the amplifier 2, and the spindle motor 10 continues its rotation at a constant rotational speed. On the other hand the change-over switch circuit 32 passes therethrough the CLV jump indication signal to the jump pulse generator 17 which then produces the jump pulses in synchronism with the the vertical synchronous pulses as well as the timing pulses from the timing pulse generator 26. When the jump pulse is applied to the change-over switch 15, the change-over switch 15 blocks the error signal from the error detector 16 and passes therethrough the jump pulse to the driver 14 which then controls the servo mechanism 13 so that the detecting spot jumps backwardly by a predetermined distance which corresponds to one or more pitches of the track on the recording disc 11. When the jump pulse disappears, the error signal is supplied through the change-over switch 15 to the driver 14 which perform the tracking servo control. The above-mentioned jump-back operation is repeated as long as the pause indication signal lasts.

It is now to be noted that since the spindle servo control is disabled as long as the pause signal lasts, the lock-in operation in the time-axis, or tangential, servo can be easily made at the end of the pause signal.

The tangential servo is, for example, made on the basis of phase-difference between a reference signal and either the horizontal synchronous pulse signal or color subsidiary signal obtained from the recording disc.

When, furthermore, the timing pulse generator 26 is adapted to produce "frame" position indication pulses in synchronism with the rotation of the spindle motor 10, it may be possible to store a timing when the leading edge of the pause indication signal appears and to restart the reproduction of the information at the stored timing upon release of the pause indication so that the same picture at the beginning of the pause mode of operation can be reproduced upon release of the pause mode of operation.

It will be understood that the invention is not to be limited to the exact construction shown and described and that various changes and modifications may be made without departing from the spirit and scope of the invention, as defined in the appended claims.

What is claimed is:

1. An apparatus for reading information from an information recording disc in which the information is recorded successively in the circumferential direction, which comprises:
   a pick-up transducer having a detecting spot which is to be aligned on a portion of said recording disc and for reading the information from said portion,
   recording disc drive means for rotating said recording disc in the vicinity of said pick-up transducer at a rotational speed which is variable with the radial position of said pick-up transducer with respect to said recording disc;
   pause signal generating means for producing a pause signal;
   timing pulse signal generating means for consecutively generating a timing pulse signals at a predetermined rate proportional to the rotational speed of said recording disc;

jump pulse generating means for generating a jump pulse in synchronism with said timing pulse signals during a time period when said pause signal is present; and pick-up transducer positioning means connected to said pick-up transducer, for driving said pick-up transducer so that said detecting spot jumps by a predetermined radial distance on said recording disc in response to said jump pulse.

2. An apparatus as defined in claim 1, in which said recording disc drive means rotates said recording disc at such a rotational speed that the relative velocity between said detecting spot and said recording disc is constant notwithstanding the radial position of said pick-up transducer with respect to said recording disc.

3. An apparatus as defined in claim 1, in which said recording disc drive means is adapted to maintain the rotational speed of said recording disc at a speed when said pause signal appears during when said pause signal lasts.

4. An apparatus as defined in claim 1, in which said jump signal generating means includes a flip-flop circuit adapted to be triggered by each of said timing pulse signals, an AND gate for passing therethrough pulse signals from said flip-flop circuit when it is triggered by the vertical synchronous pulse, a monostable multivibrator for producing a pulse with a predetermined pulse width at a time when it is triggered by the pulse passed through said AND gate, and a jump pulse generating circuit for producing said jump pulse in response to said pulse from said monostable multivibrator.

* * * * *

UNITED STATES PATENT AND TRADEMARK OFFICE
CERTIFICATE OF CORRECTION

PATENT NO. : 4,403,259
DATED : Sept. 6, 1983
INVENTOR(S) : KEIJI MASAKI

It is certified that error appears in the above-identified patent and that said Letters Patent are hereby corrected as shown below:

On the title page, insert

-- [30] Foreign Application Priority Data

September 30, 1980  JAPAN ................55-138251--

Signed and Sealed this

Third Day of April 1984

[SEAL]

*Attest:*

GERALD J. MOSSINGHOFF

*Attesting Officer*  *Commissioner of Patents and Trademarks*